United States Patent [19]
Wolff et al.

[11] 3,971,698
[45] July 27, 1976

[54] NUCLEAR REACTORS

[75] Inventors: Paul Heinz Walter Wolff, Rugby; John Malcolm Peberdy, Huncote, both of England

[73] Assignee: United Kingdom Atomic Energy Authority, London, England

[22] Filed: Aug. 6, 1973

[21] Appl. No.: 385,707

[30] Foreign Application Priority Data
Aug. 7, 1972 United Kingdom............... 36815/72

[52] U.S. Cl. ................................ 176/43; 176/61; 176/78; 176/83
[51] Int. Cl.[2] .......................................... G21C 3/04
[58] Field of Search .................. 176/51, 61, 64, 43, 176/78, 83

[56] References Cited
UNITED STATES PATENTS

| | | | |
|---|---|---|---|
| 3,060,111 | 10/1962 | Sherman et al. ...................... | 176/43 |
| 3,104,219 | 9/1963 | Sulzer ................................... | 176/83 |
| 3,121,666 | 2/1964 | Wheelock ............................. | 176/83 |
| 3,309,280 | 3/1967 | Balog ................................... | 176/61 |
| 3,317,399 | 5/1967 | Winders ............................... | 176/78 |
| 3,318,777 | 5/1967 | Keruenoael et al. .................. | 176/61 |
| 3,365,372 | 1/1968 | Swanson et al. ...................... | 176/83 |
| 3,383,287 | 5/1968 | Jackson ................................ | 176/78 |
| 3,386,885 | 6/1968 | Wright ................................. | 176/64 |

Primary Examiner—Harvey E. Behrend
Attorney, Agent, or Firm—Larson, Taylor and Hinds

[57] ABSTRACT

A nuclear reactor having a core structure comprising a plurality of closely packed parallel fuel element assemblies. Each assembly comprises a cluster of parallel fuel pins enclosed by a tubular casing through which coolant flow is directed. There is provided barrier means extending longitudinally through the cluster to define inner and outer coolant flow ducts each containing fuel pins. Gagging means for the ducts provides that the temperature of the coolant leaving the outer duct is lower than that leaving the inner duct so that the tubular casing is maintained relatively cool thereby to reduce irradiation growth and consequent bowing of the casing. The fuel pins in the outer duct may be of breeder material further to reduce the operating temperature of the casing.

2 Claims, 6 Drawing Figures

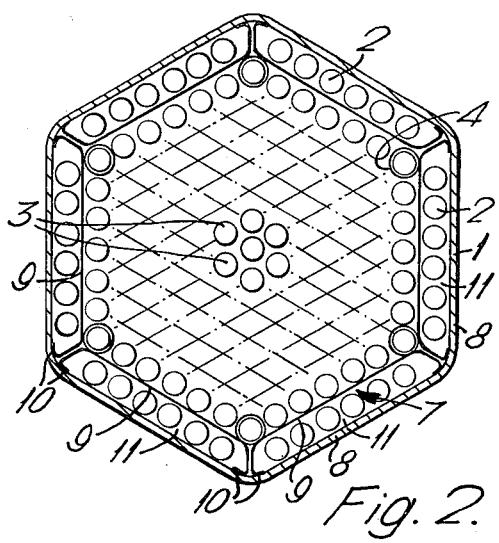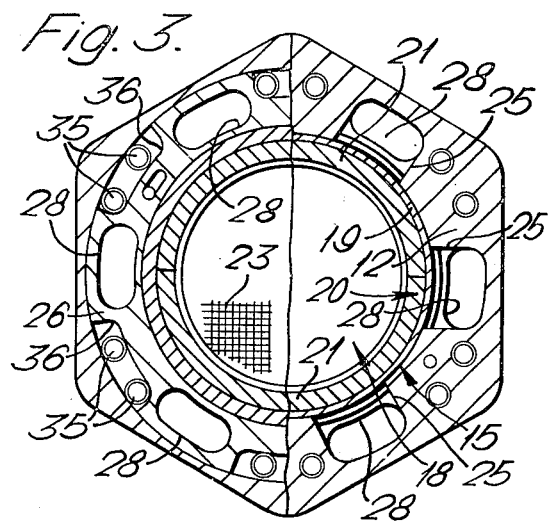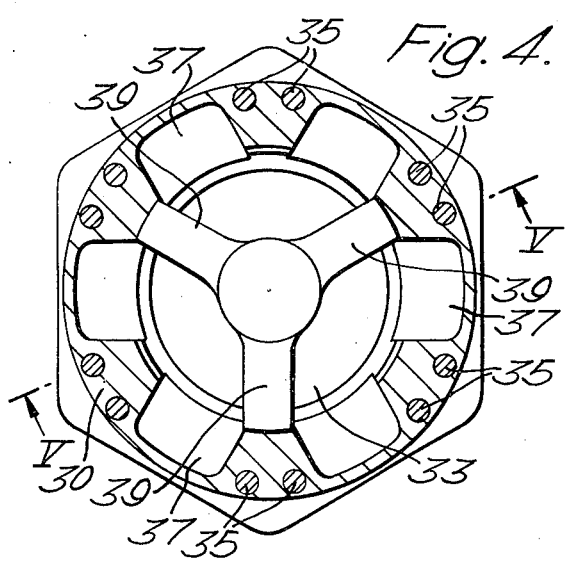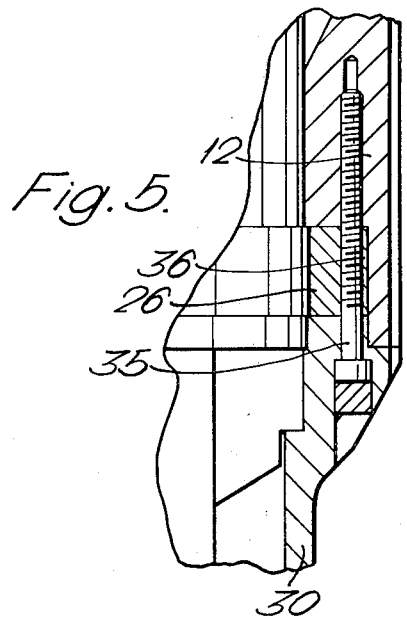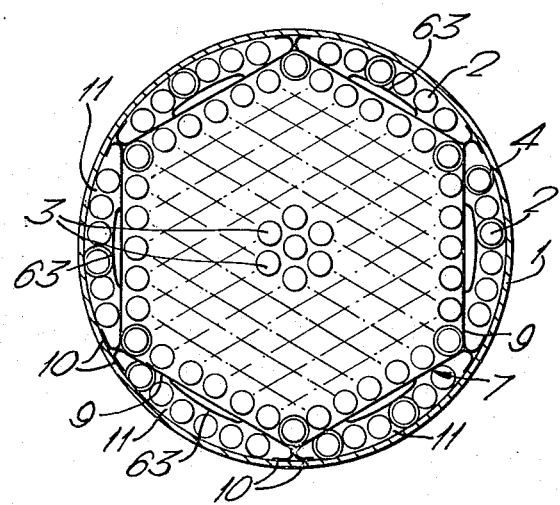

NUCLEAR REACTORS

BACKGROUND OF THE INVENTION

This invention relates to nuclear reactors of the kind having a core structure comprised of closely packed parallel fuel element assemblies. Such fuel element assemblies may be of the type in which a plurality of elongate fuel pins are arranged parallel to one another and spaced apart within an outer tubular casing. Close packing of such fuel element assemblies is to be found in reactor cores without fixed moderator, that is to say in fast reactor cores and in reactor cores cooled by moderating liquids, such as in pressurised and boiling water reactors.

In a typical sodium cooled fast reactor core structure the fuel element assemblies are supported from a bottom core support structure or diagrid. Entry of sodium coolant into the fuel element assemblies is at their lower ends that is, in the region of the diagrid. Coolant flow is through the outer tubular casings of the fuel assemblies over the fuel pins contained therein, heat being extracted from the fuel pins by the coolant flowing through the casings. The rate of coolant flow through the fuel element assemblies is controlled by gagging means located within the lower ends of the casings of the fuel element assemblies.

In a nuclear reactor core structure the neutron flux distribution varies across the width of the core structure; generally the neutron flux is a maximum at the centre of the core structure falling to a lesser value at the periphery.

Materials such as stainless steel, which are used for the manufacture of fuel element assemblies of the kind described, are subject to the phenomenon of irradiation induced voidage growth. This phenomenon entails physical growth of material under neutron irradiation, the degree of growth being dependent on the intensity of the neutron flux. Fuel element assemblies at certain positions in the core structure will be subject to a neutron flux gradient. Because of the progressive reduction of neutron flux towards the periphery of the core structure, a fuel element assembly will be subject to a lower neutron flux on its side towards the outside of the core structure and will be subject to a higher neutron flux on its side towards the centre of the core structure. Thus the two sides of the casing of the fuel element assembly towards the outside and towards the inside of the core structure will be subjected to a differential growth. The side of the casing of the fuel element assembly towards the centre of the core structure will be subject to a greater growth than the side towards the outside of the core structure. This differential growth will induce bowing in the fuel element assemblies which can give rise to difficulties in operation of the reactor. For example the bowing can cause difficulties in removal of the fuel element assemblies from the core structure during a refuelling operation.

Irradiation induced voidage growth is known to be temperature dependent. Lowering of the operating temperature of the casings of the fuel element assemblies can result in a significant reduction of the degree of bowing which occurs.

One method of reducing the casing temperature of fuel element assemblies is by under gagging the fuel element assemblies so as to increase the rate of coolant flow therethrough. Increased coolant flow means that the coolant temperature and hence the temperature of the casings of the fuel element assemblies is decreased for the same rate of heat extraction. However this procedure has disadvantages because the theoretical efficiency of the plant is reduced by the decrease of coolant outlet temperature that results.

SUMMARY OF THE INVENTION

According to the invention, in a nuclear reactor having a core structure comprising closely packed parallel fuel element assemblies, each assembly comprising a cluster of spaced fuel pins arranged parallel to each other within a tubular casing, there is provided in each assembly longitudinally extending barrier means defining inner and outer coolant flow ducts through the casing, an outer group of fuel pins being contained in the outer duct and the remainder of the fuel pins of the assembly being contained in the inner duct, and gagging means for restricting coolant flow through the ducts arranged so that the temperature of the coolant flow from the outer duct is lower than that from the inner duct.

Because the coolant flowing over the outer rows of fuel pins is at a lower temperature than the temperature of the bulk coolant flow over the remainder of the fuel pins the casings of the fuel element assemblies are subjected to a lower temperature than would be the case if the casings were subjected to the temperature of bulk coolant flow through the fuel element assemblies. Operation of the casings of the fuel elements at a reduced temperature results in a reduction in the amount of bowing of the fuel element assemblies due to a reduction of the amount of irradiation induced voidage growth in the casing of the fuel element assemblies.

The invention also resides in a nuclear reactor fuel element assembly comprising a cluster of spaced fuel pins arranged parallel to each other within a tubular casing, wherein there is provided longitudinally extending barrier means defining inner and outer coolant flow ducts through the casing, the outer row of fuel pins being contained in the outer duct and the remainder of the fuel pins being contained in the inner duct, and adjustable gagging means for varying the fractions of total coolant flow through the ducts.

According to a further feature of the invention it is additionally provided that the outer row of fuel pins in the fuel element assembly contain breeder material whilst the remainder of the fuel pins contain fissile material. Thus the heat generation in the outer row of fuel pins is further reduced leading to a further reduction in the temperature of the outer casing of the fuel element assembly.

DESCRIPTION OF THE DRAWINGS

Embodiments of the invention will now be described by way of example with reference to the accompanying drawings in which:

FIG. 2 is a cross-section along the line II—II in FIG. 1, FIG. 3 is a cross-section along the line III—III in FIG. 1, FIG. 4 is a cross-section along the line IV—IV in FIG. 1, FIG. 5 is a part longitudinal cross-section along the line V—V in FIG. 4, FIG. 6 is a view like that of FIG. 2 but showing a circular section casing.

DESCRIPTION OF THE PREFERRED EMBODIMENTS

Figure 1:
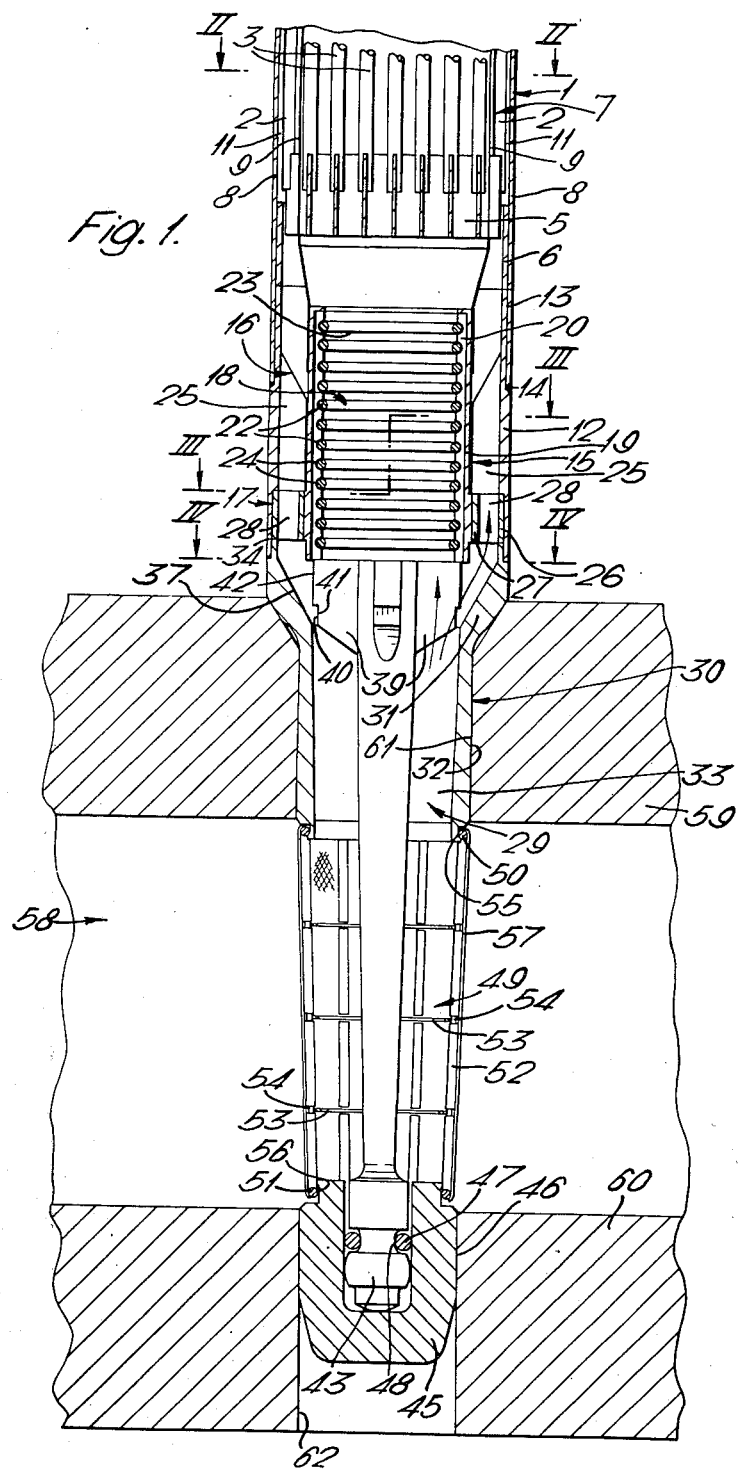
FIG. 1 is a longitudinal sectional elevation of one form of fuel element assembly in accordance with the invention.

Referring to FIG. 1 of the drawings this shows a nuclear reactor fuel element assembly comprising an outer tubular casing 1 of hexagonal cross-section; the casing 1 is of stainless steel.

Within the casing 1 there is arranged an assembly of thirty-six breeder pins 2 and one hundred and twenty-seven fuel pins 3. The fuel pins 3 extend longitudinally through the casing 1 parallel one to another and are arranged in hexagonal lattice form. The breeder pins 2 are arranged in an outer row surrounding the assembly of fuel pins 3.

Each of the fuel pins 3 comprises a tubular sheath of stainless steel containing fissile nuclear fuel material which is of ceramic form. Spacing means for the fuel pins 3 comprises a helically wrapped wire 4 on the sheath of each fuel pin 3. Likewise each of the breeder pins 2 comprises a tubular sheath of stainless steel containing nuclear breeder material which also is of ceramic form. The sheaths of the breeder pins 2 are also provided with helically wrapped wires 4 serving as spacing means.

The breeder pins 2 and the fuel pins 3 are supported at their lower ends within the casing 1 by a bottom support grid 5 which is mounted from a support ring 6 fitted inside the lower end of the casing 1.

Referring now especially to FIG. 2, the outer ring of breeder pins 2 is separated from the inner assembly of fuel pins 3 by a barrier construction 7. Being of hexagonal cross-section the casing has six flat sides 8. The barrier construction 7 comprises six individual separator baffles 9 which extend longitudinally inside the casing 1 parallel to the inside faces of the sides 8. Each of the separator baffles 9 is formed from a strip of stainless steel sheet the longitudinal edges of which are bent over to form flanges 10. The flanges 10 are welded along the internal corners between adjacent sides 8 of the casing 1. Passageways 11 are thus defined between the separator baffles 9 and the inside faces of the sides 8 of the casing 1. Each passageway 11 contains the six breeder pins 2 which extend adjacent the corresponding side 8 of the casing 1.

As shown in FIG. 1 an extension sleeve 12 is fitted into the lower end of the casing 1. The extension sleeve 12 is of hexagonal cross-section corresponding to the cross-section of the casing 1. The end of the casing 1 engages an external rebate 13 on the extension sleeve 12 and is secured to the sleeve by a circumferential edge weld 14. The extension sleeve 12 has a bore 15 of circular cross section. At its upper end the bore 15 opens into a conical throat 16. At its lower end the bore 15 has a counterbore 17 of large diameter. A main gag assembly 18 is fitted in the bore 15 of the extension sleeve 12. The gag assembly 18 comprises an outer sleeve 19 which is a close fit in the bore 15, a collet sleeve 20 which is split longitudinally in two halves 21 and fits inside the outer sleeve 19, and a series of toroidal rings 22 having wire mesh discs 23 and fitting in longitudinally spaced annular grooves 24 inside the collet sleeve 20. The lower end of the barrier construction 7 is shaped to fit about the upper end of the outer sleeve 19 of the gag assembly 18 the outer sleeve 19 forms a lower extension of the barrier construction 7.

Six longitudinal slots 25 in the bore 15 of the extension sleeve 12 connect between the conical throat 16 at the upper end of the bore 15 and the counterbore 17 at the lower end of the bore 15. The longitudinal slots 25 in the bore 15 of the extension sleeve 12 are disposed in alignment with the passageways 11.

As shown in FIG. 3 a gag ring 26 is fitted in the counterbore 17 at the lower end of the bore 15 in the extension sleeve 12. The gag ring 26 fits about a raised circumferential land 27 on the outer sleeve 19 of the gag assembly 18. The gag ring has six ports 28 which correspond to the six longitudinal slots 25 in the bore 15 of the extension sleeve 12.

A spike member 29 at the lower end of the fuel element assembly comprises an upper end adaptor sleeve 30. The adaptor sleeve 30 has a head 31 corresponding in shape to the lower end of the extension sleeve 12 with which it is cojoined. The adaptor sleeve 30 has an external cylindrical bearing surface 32 of smaller diameter than the head 31 and a bore 33. The head 31 of the adaptor sleeve 30 has a circumferential rebate 34 which fits inside the lower end of the extension sleeve 12. As shown in FIGS. 4 and 5 the extension sleeve 12 and the upper end adaptor sleeve 30 are fastened together by twelve high tension socket headed screws 35 which, as shown in FIG. 3 extend through external longitudinal slots 36 in the gag ring 26. As shown in FIGS. 1 and 4 six longitudinal slots 37 inside the head 31 of the adaptor sleeve 30 lead from the bore 33 therein and are disposed in alignment with the ports 28 in the gag ring 26 and with the longitudinal slots 25 in the bore 15 of the extension sleeve 12.

The spike member 29 also includes a strut member 38 which extends co-axially from the adaptor sleeve 30. The strut member 38 has three radially extending spider arms 39 at its upper end and the spider arms 39 fit inside the upper end of the bore 33 in the adaptor sleeve 30. The bore 33 of the adaptor sleeve 30 has an internal circumferential land 40 and the spider arms 39 of the strut member 38 have rebates 41 at the ends of their outer faces 42, which rebates 41 engage with the internal land 40 in the bore 33 of the adaptor sleeve 30 and thus locates the strut member 38 longitudinally with respect to the adatpor sleeve 30.

The lower end of the strut member 38 has a cylindrical boss 43 over which there is fitted a lower nose piece 45. The nose piece 45 has an external cylindrical bearing surface 46 and is located on the cylindrical boss 43 of the strut member 38 by two straight pins 47 secured in holes in the body of the lower nose piece 45 and serving to hold it loosely to the strut member 38. The pins engage with a groove 48 around the cylindrical boss 43 of the strut member 38.

A filter assembly 49 forming part of the spike member 29 comprises upper and lower toroidal ring members 50 and 51 which are joined by longitudinal rods 52. Intermediate spacing of the rods 52 is by inner ring members 53 which engage with grooves 54 in the rods 52. The upper ring member 50 of the filter assembly 49 fits around a rebate 55 at the lower end of the adaptor sleeve 30 of the spike member 29. The lower ring member 51 of the filter assembly 49 fits around a rebate 56 at the upper end of the nose piece 45 of the spike member 29. The sub-structure of the filter assembly 49 comprising the upper and lower ring members 50, 51 and the longitudinal rods 52 is covered by a wire gauze filter sleeve 57.

In use the fuel element assembly of FIG. 1 forms part of the core structure of a nuclear reactor with the spike member 29 plugged into a bottom core support structure or diagrid 58. The diagrid 58 comprises upper and lower plate members 59 and 60. The spike member 29 fits in the diagrid 58 with the cylindrical bearing surface 32 of the adaptor sleeve 30 fitting in an aperture 61 in the upper plate member 59 of the diagrid 58 and with the lower nose piece 45 of the spike member 29 fitting in an aperture 62 in the lower plate member 60 of the diagrid 58.

In operation of the reactor liquid sodium coolant is passed into the fuel element assembly from the interspace between the upper and lower plate members 59 and 60 of the diagrid 58. Sodium flows into the fuel assembly through the filter assembly 49 of the spike member 29. The main sodium flow is through the main gag assembly 18 and then over the assembly of fuel pins 3 inside the barrier construction 7 within the casing 1. However a proportion of the sodium passes through the ports 28 in the gag ring 26 and then passes through the longitudinal slots 25 in the bore 15 of the extension sleeve 12 to enter the passageways 11 which are defined between the separator baffles 9 and the inside faces of the sides 8 of the casing 1. The sodium passes up the passageways 11 over the breeder pins 2 contained therein. It is arranged that the rate of sodium flow through the passageways 11 over the breeder pins 2 is greater than the rate of main sodium flow over the fuel pins 3. Thus the sodium flowing over the breeder pins 2 will be at a lower temperature than the sodium flowing over the fuel pins 3. The sodium flowing over the breeder pins 2 will also be inherently at a lower temperature because of the lesser heat generation in the breeder pins 2. This means that the casing 1 of the fuel element assembly will be operated at a lower temperature than would be the case if the casing were subjected to the temperature of the main sodium flow over the fuel pins 3. Operation of the casing 1 of the fuel element assembly at a lower temperature reduces the amount of irradiation induced voidage growth which occurs in the casing 1 of the fuel element assembly. Therefore where the fuel element assembly is located in a position in the reactor core structure where it will be subjected to a transverse gradient in the neutron flux the amount of bowing of the fuel element assembly due to differential growth of the casing under irradiation will be reduced.

The gag ring 26 can be adjusted in angular position before charging of the fuel element assembly into the reactor core structure so as to adjust the degree of overlap of the ports 28 in the gag ring with the longitudinal slots 25 in the bore of the extension sleeve 12. By this means the rate of sodium flow over the breeder pins 2 can be preset to the required amount.

In FIG. 6 a fuel assembly with a casing 1 of circular section is shown. The separator baffles 9 are fitted with additional pad members 63 which locate the breeder pins 2 against the inside faces of the casing 1. The pad members 63 are continuous over the full length of the baffles 9 but they may be made discontinuous along the length of the baffles 9 to serve as local supports only. The continuous pad members 63 form open ducts for coolant flow but alternatively they may be arranged to enclose stagnant columns of coolant.

At the upper end of the fuel element assembly the separate sodium flows from each side of the separator baffles 9 are allowed to mix giving a uniform coolant outlet temperature from the fuel element assembly. This can be achieved by means of V-slots cut in the upper ends of the separator baffles 9 allowing gradual mixing of the two flows.

We claim:

1. A nuclear reactor having a plurality of upstanding fuel element assemblies closely packed side-by-side to form a core, each fuel element assembly comprising:
   a bundle of closely spaced fuel pins,
   a tubular casing enclosing the bundle of fuel pins,
   a tubular lower end fitting for the casing, the end fitting having an inlet port for coolant flow,
   a tubular barrier construction extending co-axially within the casing dividing the fuel pins into inner and outer groups, the outer group containing a single row of fuel pins,
   a barrier extension extending co-axially within the lower end fitting defining inner and outer coolant flow ducts,
   a main gag assembly within the inner duct for restricting flow of coolant over the inner group of fuel pins, and
   a ported gag ring within the outer duct for restricting flow of coolant over the outer group of fuel pins.

2. A nuclear reactor according to claim 1, wherein the lower end fitting of the fuel element assembly has internal radial extensions defining an annular series of inlet flow channels for the outer duct and the ported gag ring is disposed adjacent the radial extensions with the ports in register with the flow channels, the ported gag ring being rotatable on the barrier extension to enable the ports to be displaced relative to the inlet flow channels of the outer duct during assembly of the fuel element assembly.

* * * * *